United States Patent [19]

Miller

[11] Patent Number: 5,212,540

[45] Date of Patent: May 18, 1993

[54] METHOD FOR MEASURING A THICKNESS OF A PRINTED CIRCUIT BOARD

[75] Inventor: Donald W. Miller, Boise, Id.

[73] Assignee: Micron Technology, Inc., Boise, Id.

[21] Appl. No.: 796,465

[22] Filed: Nov. 22, 1991

[51] Int. Cl.$^5$ .............................................. G01B 11/06
[52] U.S. Cl. ................................................. 356/381
[58] Field of Search ................ 356/381, 382, 375, 376, 356/394, 237, 355, 357; 250/560-562

[56] References Cited

U.S. PATENT DOCUMENTS

| 4,818,118 | 4/1989 | Bantel et al. | |
|---|---|---|---|
| 4,826,321 | 5/1989 | Coates et al. | |
| 5,075,559 | 12/1991 | Amir | 356/381 |

FOREIGN PATENT DOCUMENTS

| 2842670 | 4/1980 | Fed. Rep. of Germany | 356/381 |
|---|---|---|---|
| 0216904 | 12/1983 | Japan | 356/382 |
| 0263403 | 10/1988 | Japan | 356/381 |

OTHER PUBLICATIONS

Stupin et al., "Automated Computer Analysis of X-Ray Radiographs Greatly Facilitates Measurement of Coating Thickness Variations in Laser Fusion Targets" J Vac Sci Technol., vol. 20, 1982, pp. 1071-1074.

Bubenzer, et al., "Exact expressions for calculating thin-film absorption coefficients from laser calorimetric data" Applies Optics, vol. 23, No. 17, Sep. 1984, pp. 2886-2891.

Latukhin, et al., "Possibility of Use of a Co-Laser in thickness Measuremetn of Polymer Coatings" Sov. J. Nondestr. Test., vol. 24, No. 1, pp. 65-70.

D. P. Almond, et al., "The Testing of Plasma-Sprayed Coatings by Thermal-Wave Interferometry" Mater. Eval., vol. 45, No. 4, pp. 471-475.

J. Corbett et al., "Non-Contacting Thermal Wave Technique for NDT of Coatings and Other Applications in the CEGB:Current Status (Jul. 1987)" Central Electricity Generating Board-Report, Oct. 1988.

D. M. Stupin, "Radiographic Detection of 100 A Thickness Variations in 1- MU M-Thick Coatings Applied to Submillimeter-Diameter Laser Fusion Targets" Los Alamos National Lab. Report, 1986.

Author Unknown, "Measuring Thickness of Coatings on Metals a Digital Light Sensor and Eddy-Current Sensor Measure Thickness Without Contact" NASA, Oct. 1986.

Miller, "Thermal Wave Imaging" Infrared Technlology XII; Proceedings of the Meeting, San Diego, Calif., Aug. 19-20, 1986, pp. 16-22, ref. p. 7.

D. J. Fischer et al., "A Non-Contact Method for Automated Inspection of Nonconductive Coatings on Metallic Substrates" Review of Progress in Quantitative Non-Destructive Evaluation, Vo. 5A, 1985, pp. 863-869.

Mankevich, et al., "Combined Laser and Electric-Discharge Method for Determining the Thickness of Metal Coatings" Zhurnal Prikladnoi Spektroskopii, vol. 24, Jan. 1976, pp. 139-141.

Author Unknown, "Thermal Constant Measuring Instrument" Japan Report Product Opportunities, May 1988, vol. 1, No. 9.

(List continued on next page.)

Primary Examiner—Richard A. Rosenberger
Assistant Examiner—Hoa Q. Pham
Attorney, Agent, or Firm—Wells, St. John, Roberts, Gregory & Matkin

[57] ABSTRACT

The invention relates to a method for measuring a thickness of a printed circuit board having a plating portion provided on a core portion. The method includes directing a laser beam to the core portion of the printed circuit board, whereby the laser beam at least partially reflects from the core portion. The reflected laser beam is monitored and a thickness of the core portion is determined based upon the reflected laser beam. The plating portion of the printed circuit board is then heated by transferring a selected amount of energy thereto. The thermal characteristics of the heated plating are monitored and a thickness of the plating portion is determined based upon these thermal characteristics.

27 Claims, 5 Drawing Sheets

OTHER PUBLICATIONS

J. T. Luxon, et al., "Industrial Lasers and Their Applications" Prentic-Hall Inc., Chapter 9, pp. 154–157.

G. C. Wetsel, Jr. et al., "Coating Thickness Determination Using Photothermal Heating" 1986 Ultrasonics Symposium, IEEE, pp. 491–494.

Bose, et al., "Laser Measurement System for On-Line Control of a Manufacturing Process" IEEE Int. Conf. Syst. Eng., 1989, pp. 247–250.

D. J. Fischer, et al., "Non-Contact Method for Automated Inspection of Nonconductive Coatings on Metallic Substrates" Review of Progress in Quantitative Nondestructive Evaluation, vol. 5A, 1986, pp. 863–869.

Saniie et al., "Thermal Wave Imaging: Thickness Measurement and Depth-Profiling Through Radio Frequency Induction Heating" Review of Progress in Quantitative Nondestructive Evaluation, vol. 3B, 1984, pp. 769–777.

D. P. Almond, et al., "The Testing of Plasma-Sprayed Coatings by Thermal-Wave Interferometry" Master. Eval., vol. 45, Apr. 1987, pp. 471–475.

P. Cielo, et al., "Optothermal NDE of Thermal-Barrier Coatings" American Society for Metals, 1985, pp. 107–116.

D. P. Almond et al., "The Non-Destructive Evaluation of Surface Coatings by Phtothermal Imagining" J. Mater. Engergy Syst., vol. 6, 1985, pp. 287–292.

Saniie et al., "Thermal Wave Imaging: Thickness Measurement and Depth-Profiling Through Radiofrequency Induction Heating" Review of Prgress in Quantitative Nondestructive Evaluation, vol. 3B, 1984, pp. 769–777.

METHOD FOR MEASURING A THICKNESS OF A PRINTED CIRCUIT BOARD

TECHNICAL FIELD

The present invention relates to a method for measuring the thickness of a printed circuit board.

BACKGROUND OF THE INVENTION

As is well known, a printed circuit board (PCB) is a thin laminated board having multiple integrated circuit (IC) chips mounted thereon. Multiple conductive paths are formed on the PCB to provide communication among the multiple IC chips. PCBs commonly have an edge connector provided along one side which is adapted to be inserted into a receptacle on a control board, such as a "mother board" in a personal computer. The edge connector has conductive leads, formed of solder or other conductive material, which contact connectors provided in the receptacle. As a result, the PCB is electrically coupled to the mother board.

The thickness of the circuit boards, and particularly the thickness of the edge connectors, is very important to ensure proper electrical contact. The connectors housed in the receptacle are often shaped in a clamp-like manner to grip the edge connector when the PCB is inserted into the receptacle. The clamp-like connectors can scrape a significant amount of the conductive solder away from the edge connectors if the edge connectors are too thick, resulting in a poor fit and poor electrical contact. On the other hand, if the edge connectors are too thin, a loose fit results, causing poor or intermittent electrical contact.

Therefore, many companies implement a testing process to measure the thickness of the edge connectors of PCBs prior to shipment or insertion into receptacles on a control board. Such tests assist in controlling the quality of the PCB supplied to distributors and ultimate end users by ensuring that only boards with accurate thickness are shipped and installed.

One technique for measuring the thickness of PCBs involves a mechanical sensor which is first initialized to a flat reference surface, and then maneuvered over the edge of the PCB as the PCB lies on the reference surface. A distance signal is generated based upon the sensor location in relation to the reference surface. The mechanical sensor employs a small roller which is rolled over the edge connector area of the PCB.

The mechanical sensor follows the surface of the PCB, which is not perfectly flat. The edge connector of the PCB typically has multiple conductive leads spaced evenly along the edge. The conductive leads are formed on the board through a process which leaves the conductive leads slightly raised from the board. Accordingly, as the mechanical sensor is moved across the edge connector of the PCB, the mechanical sensor moves up and down over the conductive leads. An average thickness is then computed based on the thickness profile measured across the entire length of the edge connector.

Unfortunately, the above method is labor intensive. Each PCB must be measured by hand. Thus, the measuring system is impractical for high volume production.

One proposed technique for measuring the thickness of a PCB employs a laser. A laser is aimed at the PCB which is resting on a flat reference surface, and the light reflected from the PCB is monitored. Analysis is then conducted on the reflected light to determine a thickness of the PCB. The laser technique works effectively on flat surfaces. The laser technique does not, however, work effectively on non-flat, non-smooth surfaces because the light reflected from uneven surfaces is skewed which introduces significant error into the thickness analysis. Thus, an accurate reading of the entire thickness of a PCB board, including the core and the conductive leads, cannot be accurately obtained.

A method according to the present invention provides a new approach to measuring the thickness of the PCB edge connector. The method accurately measures flat and non-flat surfaces of a PCB.

BRIEF DESCRIPTION OF THE DRAWINGS

One or more preferred embodiments of the invention are described below with reference to the accompanying drawings.

DETAILED DESCRIPTION OF THE PREFERRED EMBODIMENT

This disclosure of the invention is submitted in furtherance of the constitutional purposes of the U.S. Patent Laws "to promote the progress of science and useful arts" (Article 1, Section 8).

According to one aspect of the present invention, a method for measuring a thickness of a printed circuit board having a plating portion provided on a core portion comprises the steps of:

directing a laser beam to the core portion of the printed circuit board, the laser beam at least partially reflecting from the core portion;

monitoring the laser beam reflected from the core portion;

deriving a thickness of the core portion based upon the monitoring of the laser beam reflected from the core portion;

heating the plating portion of the printed circuit board by transferring a selected amount of energy to the plating portion;

monitoring thermal characteristics of the plating portion upon transfer of the selected amount of energy to the plating portion; and deriving a thickness of the plating portion based upon the thermal characteristics.

The step of heating the plating portion of the printed circuit board may be carried out by directing a plurality of intermittent laser beam pulses to the plating portion. The step of monitoring thermal characteristics of the plating portion after heating may be carried out by measuring the surface temperature of the heated plating portion over a selected distance of the heated plating portion. Alternatively, the step of monitoring the thermal characteristics may be carried out by measuring infrared radiation emanating from the heated plating portion.

Another aspect of the present invention is to determine a total thickness of the printed circuit board based upon the thicknesses of the core portion and the plating portion. Another aspect of the present invention is to add the thickness of the core portion to the thickness of the plating portion to compute a total thickness of the printed circuit board, compare the total thickness of the printed circuit board to a selected thickness, and then determine acceptance and rejection of the printed circuit board based upon results from comparing the total thickness to the selected thickness.

Yet another aspect of the present invention is to provide a method for measuring a thickness of a printed circuit board having a plating portion provided on a core portion comprising the steps of:

moving the printed circuit board to a core thickness measuring station;

directing a laser beam to the core portion of the printed circuit board, the laser beam at least partially reflecting from the core portion;

monitoring the laser beam reflected from the core portion;

deriving a thickness of the core portion based upon the monitoring of the laser beam reflected from the core portion;

moving the printed circuit board from the core thickness measuring station to a plating thickness measuring station;

heating the plating portion of the printed circuit board by transferring a selected amount of energy to the plating portion;

monitoring thermal characteristics of the plating portion upon transfer of the selected amount of energy to the plating portion;

deriving a thickness of the plating portion based upon the thermal characteristics; and determining a total thickness of the printed circuit board based upon the thicknesses of the core portion and the plating portion.

Additionally, the method according to the present invention may further comprise the steps of:

directing the laser beam at a selected surface for supporting the printed circuit board prior to the step of moving the printed circuit board to the core thickness measuring station, the laser beam at least partially reflecting from the selected surface;

monitoring the laser beam reflected from the selected surface; and initializing a reference value based upon the monitoring of the laser beam reflected from the selected surface, the reference value being used to derive the thickness of the core portion.

Figure 1A:
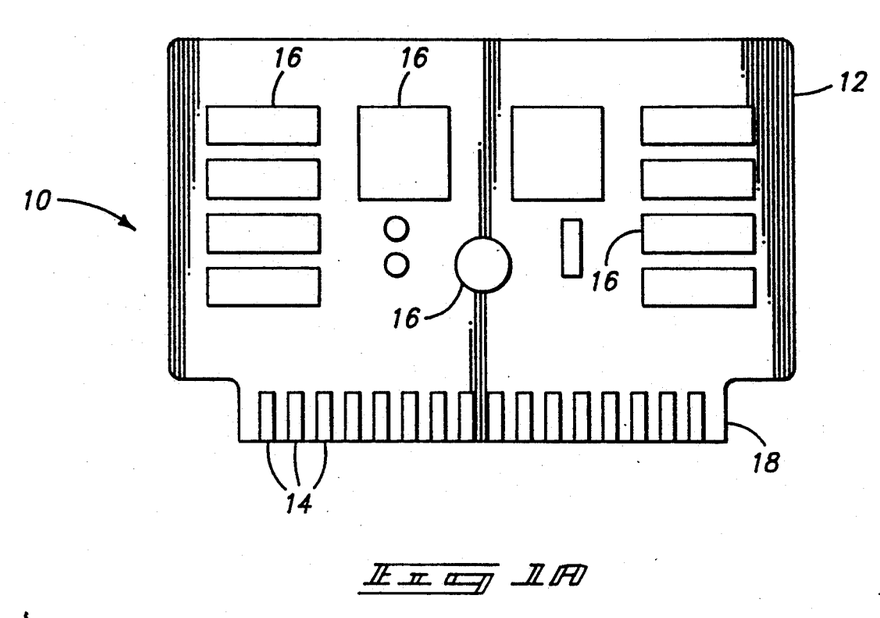
FIG. 1A is a top view a printed circuit board.
Figure 1B:
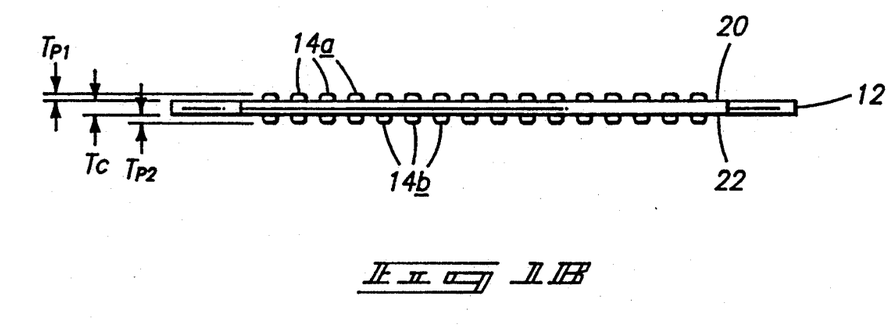
FIG. 1B is an edge view of the FIG. 1A printed circuit board.

FIGS. 1A and 1B show a printed circuit board (PCB) 10 having a core portion 12 and a plurality of conductive leads or platings 14 provided thereon. PCB 10 also includes multiple integrated circuit components 16, such as memory, logic circuits, and microprocessors. Circuit components 16 are typically mounted to PCB 10 via a surface mount or through-hole technology.

Platings 14 are provided along an edge connector 18 of PCB 10. Edge connector 18 protrudes slightly from the main body of PCB 10. Platings 14 are aligned and spaced evenly along edge connector 18. When PCB 10 is interfaced with a control board, such as a mother board in a personal computer, edge connector 18 is inserted into a female receptacle provided on the mother board. Platings 14 contact corresponding terminals provided in the receptacle to electrically couple PCB 10 to the mother board.

As shown in FIG. 1B, platings 14 are formed on opposing sides 20 and 22 of edge connector 18. Platings 14a are formed on side 20 of edge connector 18 and platings 14b are formed on side 22 of edge connector 18. Platings 14a and 14b are aligned so that plating 14a is positioned vertically in line with plating 14b. Alternatively, the platings 14a and 14b may be staggered so that a plating 14a is not vertically in line with a plating 14b. Platings 14a and 14b are typically formed of solder, copper, gold, or other conductive metal. The platings are formed on PCB 10 and thus are raised slightly from the surfaces of core portion 12. Core portion 12 is typically comprises a composite laminate of epoxy, glass and copper foils.

Although PCB 10 is described as having platings 14a and 14b on both sides thereof, the platings may be formed only on a single side. For example, platings 14a may be formed on side 20 of the PCB 10, and no platings are formed on side 22.

Other conductive paths (not shown) are provided on PCB 10 to interconnect platings 14 and circuit components 16, as is well known in the PCB art. These conductive paths are not shown in the drawing to facilitate clarity of the invention.

The thickness of edge connector 18 of PCB 10 is important to ensure proper electrical contact between PCB 10 and the receptacle provided on the mother board. For purposes of the continuing discussion, platings 14a have a thickness $T_{P1}$, core portion 12 has a thickness $T_C$, and platings 14b have a thickness $T_{P2}$. A total thickness of edge connector 18 of PCB 10 is the sum of thickness $T_{P1}$, thickness $T_C$, and thickness $T_{P2}$.

A method for measuring the thickness of edge connector 18 of PCB 10 will now be described with reference to FIG. 2. A PCB thickness measuring device 30 comprises a core thickness measuring station and a plating thickness measuring station. The core thickness measuring station measures the thickness of a core portion 48 of a PCB 44. The plating thickness measuring station measures the thicknesses of platings 76 and 78 of a PCB 80. PCBs 44 and 80 are moved through the core thickness measuring station and then through the plating thickness measuring station via a conveyor belt, robotics, or some other movement mechanism.

A laser optical system 32 is provided at the core thickness measuring station. The laser optical system 32 includes laser 34, focusing lens 36, reflection monitor 38, signal processing circuit 40, and laser controller 42. A microprocessor 54 receives information from signal processing circuit 40 and controls operation of laser 34 through laser controller 42. PCB 44 rests on top of a reference surface 46 provided at the core thickness measuring station.

Laser 34 directs a laser beam 35 to core portion 48 of PCB 44 between adjacent platings 50 and 52. Laser beam 35 at least partially reflects from core portion 48. Focusing lens 36 focuses some of the reflected laser beam onto reflection monitor 38, which may comprise a linear diode array, position detector, a charge-coupled device (CCD), or any other light monitoring device. Signal processing circuit 40 processes the information provided by reflection monitor 38. Signal processing circuit 40 may not, however, be necessary if reflection monitor 38 is capable of directly interfacing with microprocessor 54.

Laser 34 could output a continuous or intermittent laser beam 35, as desired. Laser controller 42 controls such functions as the laser intensity, the radius of laser beam 35, laser frequency and amplitude, and the duration between pulses in an intermittent laser setting.

To initialize laser 34 prior to measuring PCB thickness, laser 34 directs laser beam 35 to reference surface 46 when PCB 44 is removed from reference surface 46. At least part of laser beam 35 is reflected from reference surface 46. The reflection is focused through focusing lens 36 onto reflection monitor 38. Laser optical system 32 uses this information to compute a reference value to be used in calculating a thickness of core portion 48 of PCB 44.

Because PCB 44 has platings on each side thereof, laser optical system 32 will measure a thickness of the core which includes the thickness of platings 51 provided on the bottom of PCB 44. Platings 51 displace top surface 53 of PCB 44 farther from reference surface 46. Microprocessor 54 can, however, compute an accurate thickness by compensating for platings 51 based upon the thickness measurements of platings 51 determined at the plating thickness measuring station (to be described below).

Two photothermal systems 56 and 58 are provided in the plating thickness measuring station. Photothermal system 56 includes laser 60, thermal monitor 62, signal processing circuit 64 and laser controller 66. Similarly, photothermal system 58 includes laser 68, thermal monitor 70, signal processing circuit 72 and laser controller 74. Microprocessor 54 receives signals from signal processing circuits 64 and 72 and outputs control signals to laser controllers 66 and 74. Photothermal systems 56 and 58 are arranged on opposing sides of printed circuit board 80 to measure the thickness of platings 76 and 78, respectively.

Laser 60 directs laser beam 61 to plating 76. Laser beam 61 transfers a selected amount of energy to plating 76 to thereby heat plating 76. Preferably, laser 60 outputs a plurality of intermittent laser beam pulses to plating 76. The intermittent laser beam pulses are controlled by laser controller 66. Although the preferred embodiment is described as employing lasers, or modulated lasers, other devices may be employed to heat plating 76 such as radio frequency or electron beam devices.

Thermal monitor 62 measures the thermal characteristics of plating 76. Preferably, thermal monitor 62 measures the radiant thermal energy radiating from plating 76. Alternatively, thermal monitor 62 may measure a surface temperature of plating 76 over a selected distance of plating 76. For example, thermal monitor 62 may measure the surface temperature of plating 76 a selected distance from the location where laser beam 61 impacts plating 76. The surface temperature varies with radial distance from the laser beam impact location in a way that depends upon coating thickness. This concept is described more specifically in an article entitled "Coating Thickness Determination Using Photothermal Heating", by Wetsel et al., Ultrasonic Symposium, IEEE 1986, page 491-494. As another alternative, thermal monitor 62 may measure infrared radiation emanating from plating 76.

Photothermal system 58 measures the thickness of plating 78 in a manner identical to that described above with respect to photothermal system 56.

Microprocessor 54 uses the information received from the signal processing circuits 40, 64, and 72 to derive a core thickness and a plating thickness. Microprocessor 54 can then compute a total PCB thickness by adding the plating thicknesses to the core thickness.

Figure 2:
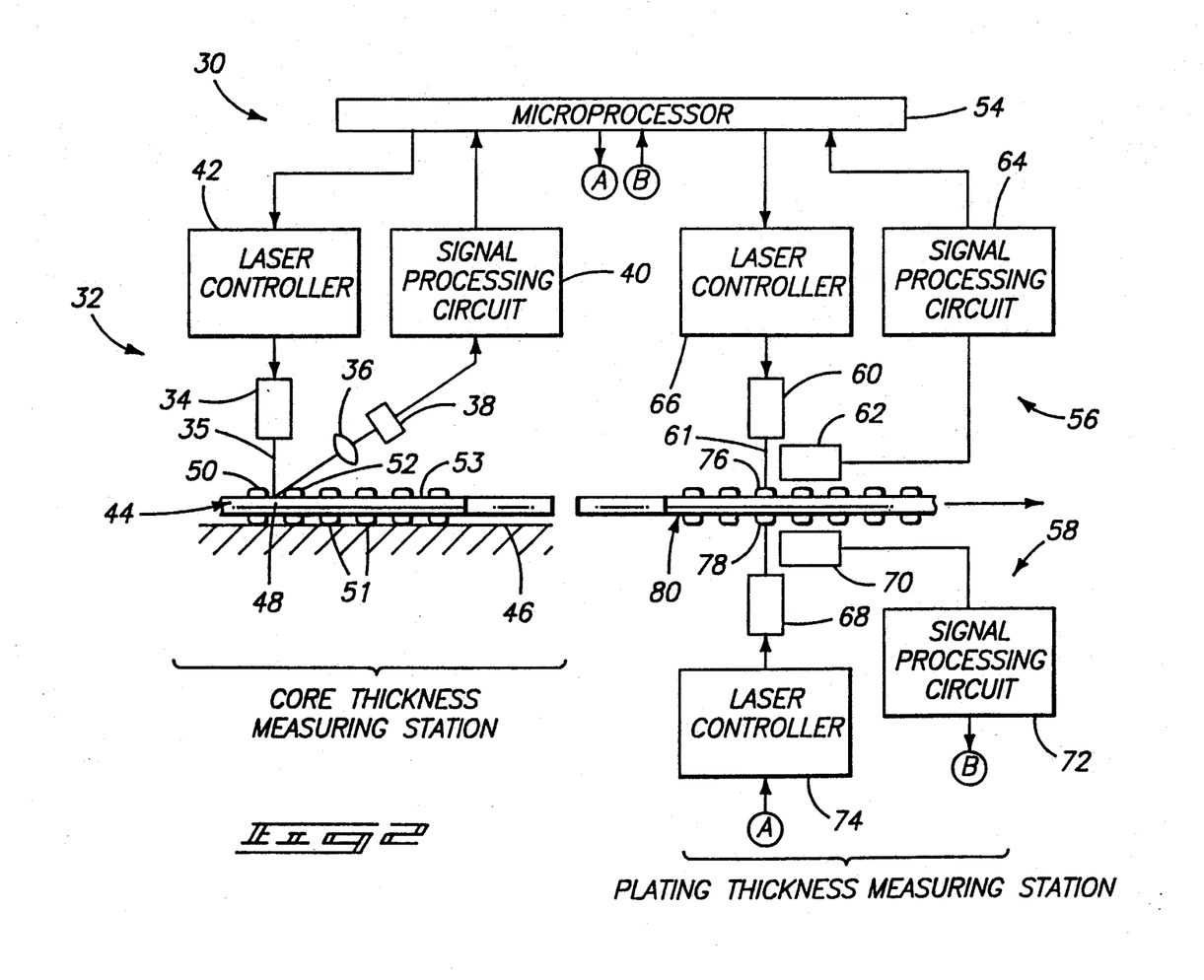
FIG. 2 illustrates one embodiment of a PCB thickness measuring apparatus in accordance with an aspect of the present invention.

The preferred embodiment illustrated in FIG. 2 is designed for a PCB having platings on opposite sides thereof. Alternatively, only one photothermal system is required (instead of two photothermal systems as shown) if, for example, the PCB is flipped over to measure both sets of platings or if the PCB only has platings on one side thereof. The core thickness measuring station and the plating thickness measuring station may be provided within the same apparatus. On the other hand, the core thickness measuring station and the plating thickness measuring station may be provided in separate apparatuses. Further, the preferred embodiment is shown as having one PCB 44 positioned in the core thickness measuring station and a second PCB 80 positioned in the plating thickness measuring station. In an alternative embodiment, the core thickness measuring station and the plating thickness measuring station may be disposed such that both thicknesses are measured simultaneously on the same PCB. Additionally, a single laser may be employed to measure both the core thickness and the plating thickness in place of using two lasers 34 and 60.

Figure 3:
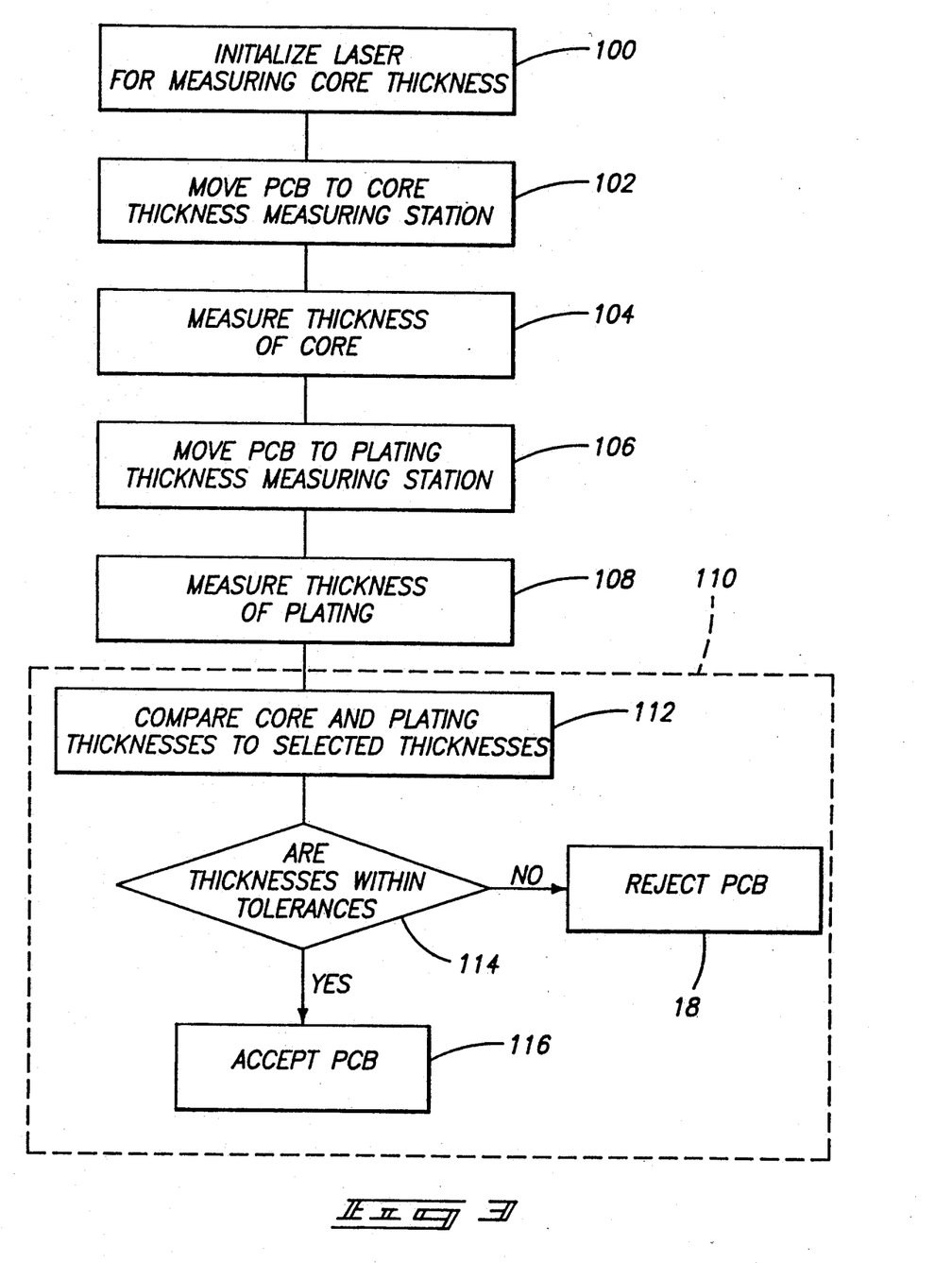
FIG. 3 is a flow diagram illustrating steps for measuring a PCB thickness in accordance with an aspect of the present invention.

A method according to the present invention is further described with reference to FIGS. 3-6. As shown in FIG. 3, the first step 100 is to initialize a laser that is employed to measure the core thickness. Initialization is accomplished by directing a laser beam to a reference surface prior to moving the printed circuit board to the core thickness measuring station. The laser beam at least partially reflects from the reference surface. The reflected beam is then monitored by the reflection monitor. The PCB thickness measuring device employs this initialization information to derive the thickness of the core portion in subsequent measurements.

Figure 4:
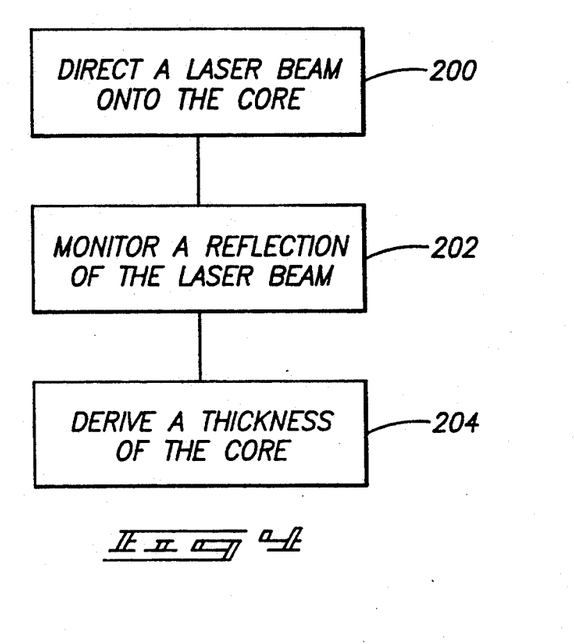
FIG. 4 is a flow diagram illustrating steps for measuring a thickness of a core portion of a PCB in accordance with an aspect of the present invention.

In step 102, a PCB is moved to the core thickness measuring station. The thickness of the core of the PCB is then measured in step 104, which is described in more detail with reference to FIG. 4. As shown in FIG. 4, the first step 200 in measuring the core portion of the PCB is to direct a laser beam onto the core, whereby the laser beam at least partially reflects from the core. Next, the laser beam reflected from the core portion is monitored in step 202. Finally, in step 204, a thickness of the core is derived based upon the monitored laser beam reflected from the core and the initialization information obtained in step 100.

Figure 5:
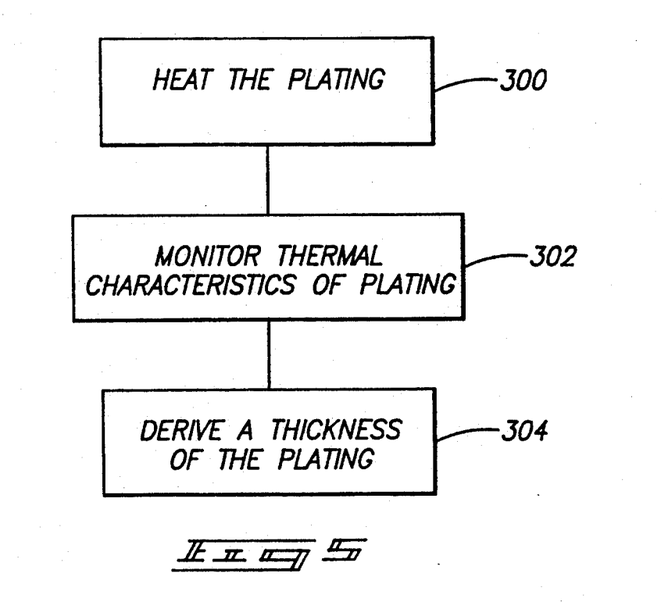
FIG. 5 is a flow diagram illustrating steps for measuring a thickness of a plating portion of a PCB in accordance with an aspect of the present invention.

Returning to FIG. 3, the next step in the method according to the present invention is to move the PCB from the core thickness measuring station to a plating thickness measuring station (step 106). The plating thickness is then measured in step 108, which is described in more detail with reference to FIG. 5. As shown in FIG. 5, the plating is first heated in step 300. The heating is accomplished by transferring a selected amount of energy to the plating. Next, the thermal characteristics of the plating are monitored in step 302. In step 304, the thickness of the plating is derived based upon the thermal characteristics monitored in step 302.

A total thickness of the printed circuit board may be then determined after the thickness of the core and the plating portions have been measured. The method according to the present invention therefore includes an acceptance/rejection analysis of the PCBs based on the determined thickness of the PCB. As shown in FIG. 3, the acceptance/rejection analysis, referenced generally as 110, includes comparing the thickness of the core portion to a selected core thickness, and comparing the thickness of the plating portion to a selected plating portion thickness in step 112. The selected core thickness and plating thickness may be stored, for example, in non-volatile memory internal to a microprocessor. The selected thicknesses are the desired thicknesses for a marketable PCB.

After the thicknesses are compared to selected thicknesses in step 112, a decision is made in step 114 to determine whether the thicknesses of the plating and core are within acceptable tolerances of the selected plating and core thicknesses. If the measured thicknesses are within acceptable tolerances, the PCB is accepted in step 116. On the other hand, if the thicknesses are not within acceptable tolerances, the PCB is rejected in step 118. Accordingly, acceptance and rejection of the PCB is based upon the results of the thickness comparisons. The PCB is rejected if either the core thickness is not within acceptance tolerances of the selected core thickness, or the measured plating thickness is not within acceptable tolerances of the selected plating thickness.

Figure 6:
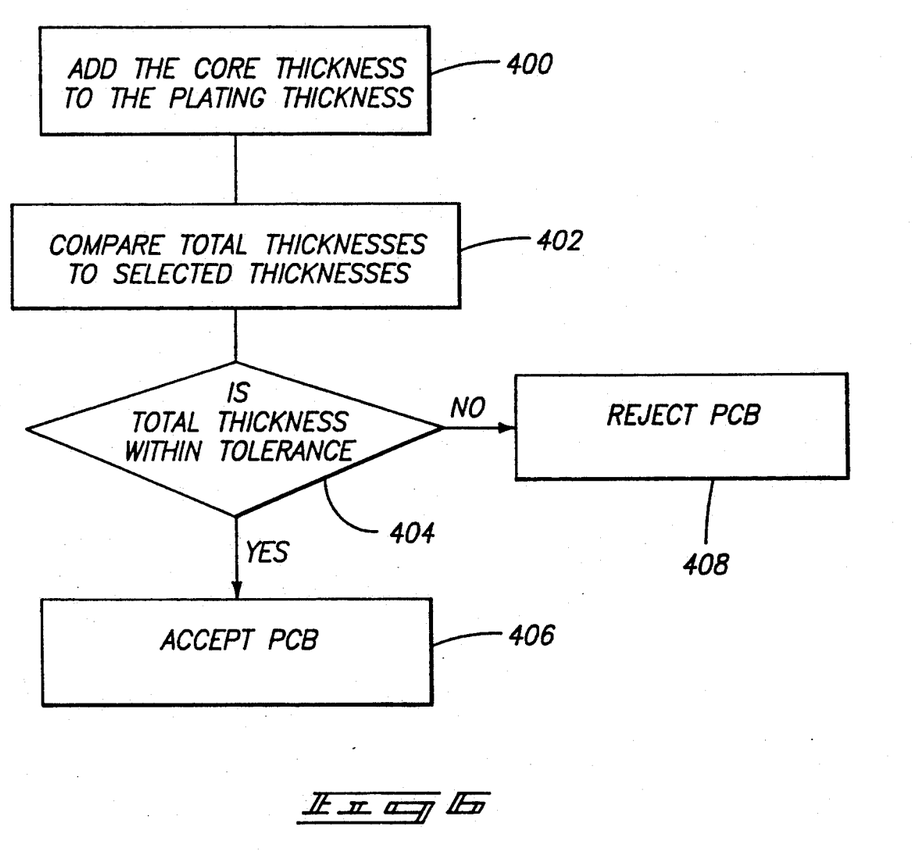
FIG. 6 is a flow diagram illustrating steps for discriminating between acceptable PCBs and non-acceptable PCBs in accordance with an aspect of the present invention.

FIG. 6 illustrates an acceptance/rejection analysis alternative to that analysis referenced generally as 110 in FIG. 3. In step 400, the measured core thickness is added to the measured plating thicknesses to compute a total thickness of the printed circuit board. Next, the total thickness is compared to a selected total thickness in step 402. Then, a decision is made in step 404 to determine whether the measured total thickness is within acceptable tolerances of the selected thickness. If the measured total thickness is within acceptable tolerance, the PCB is accepted in step 406; otherwise, the PCB is rejected in step 408. Therefore, acceptance and rejection of the PCB is based upon the comparison of a measured total thickness of the printed circuit board to the selected total thickness.

The present invention is advantageous over prior art measuring systems in that an accurate thickness of an edge connector of a PCB can be made, even though the surface of the PCB at the edge connector is uneven. Employing a laser optical measuring system to measure the core portion and photothermal measuring systems to measure the plating portions provided on the core portion results in an efficient and accurate determination of the edge connector thickness.

In compliance with the statute, the invention has been described in language more or less specific as to methodical features. The invention is not, however, limited to the specific features shown and described, since the methods herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A method for measuring a thickness of a printed circuit board having a plating portion of a first material provided on a core portion of a second material, the printed circuit board having a total thickness, the method comprising the steps of:
   directing a laser beam to the core portion of the printed circuit board, the laser beam at least partially reflecting from the core portion;
   monitoring the laser beam reflected from the core portion;
   deriving a thickness of the core portion based upon the monitoring of the laser beam reflected from the core portion to measure a first partial thickness of the total printed circuit board thickness;
   heating the plating portion of the printed circuit board by transferring a selected amount of energy to the plating portion;
   monitoring thermal characteristics of the plating portion upon transfer of the selected around of energy to the plating portion; and
   deriving a thickness of the plating portion of the printed circuit board independent of the core portion based upon the thermal characteristics to measure a second partial thickness of the total printed circuit board thickness, the second partial thickness being separated from the first partial thickness.

2. The method according to claim 1 wherein the step of monitoring the thermal characteristics of the plating portion comprises measuring a surface temperature of the plating portion over a selected distance of the plating portion.

3. The method according to claim 1 wherein the step of monitoring the thermal characteristics of the plating portion comprises measuring infrared radiation emanating from the plating portion.

4. The method according to claim 1 wherein the step of monitoring the thermal characteristics of the plating portion comprises measuring radiant thermal energy radiating from the plating portion.

5. The method according to claim 1 wherein the step of heating the plating portion comprises directing a plurality of intermittent laser beam pulses to the plating portion.

6. The method according to claim 1 wherein the step of heating the plating portion comprises directing a plurality of intermittent laser beam pulses to a location on the plating portion; and
   wherein the step of monitoring the thermal characteristics of the plating portion comprises measuring a surface temperature of the plating portion a selected distance from the location to which the laser beam is directed, the surface temperature being dependent upon the thickness of the plating portion.

7. The method according to claim 1 wherein the step of heating the plating portion comprises directing a plurality of intermittent laser beam pulses to the plating portion; and
   wherein the step of monitoring the thermal characteristics of the plating portion comprises measuring radiant thermal energy radiating from the plating portion.

8. The method according to claim 1 further comprising determining the total thickness of the printed circuit board based upon the thicknesses of the core portion and the plating portion.

9. The method according to claim 1 further comprising adding the thickness of the core portion to the thickness of the plating portion to compute the total thickness of the printed circuit board.

10. The method according to claim 1 further comprising:
adding the thickness of the core portion to the thickness of the plating portion to compute the total thickness of the printed circuit board;
comparing the total thickness of the printed circuit board to a selected thickness; and
determining acceptance and rejection of the printed circuit board based upon results from comparing the total thickness to the selected thickness.

11. The method according to claim 1 further comprising:
comparing the thickness of the core portion to a selected core thickness;
comparing the thickness of the plating portion to a selected plating thickness; and
determining acceptance and rejection of the printed circuit board based upon results of either comparison.

12. A method for measuring a thickness of a printed circuit board having a plating portion of a first material provided on a core portion of a second material, the printed circuit board having a total thickness, the method comprising the steps of:
moving the printed circuit board to a core thickness measuring station;
directing a laser beam to the core portion of the printed circuit board, the laser beam at least partially reflecting from the core portion;
monitoring the laser beam reflected from the core portion;
deriving a thickness of the core portion based upon the monitoring of the laser beam reflected from the core portion to measure a first partial thickness of the total printed circuit board thickness;
moving the printed circuit board from the core thickness measuring station to a plating thickness measuring station;
heating the plating portion of the printed circuit board by transferring a selected amount of energy to the plating portion;
monitoring thermal characteristics of the plating portion upon transfer of the selected amount of energy to the plating portion;
deriving a thickness of the plating portion of the printed circuit board independent of the core portion based upon the thermal characteristics to measure a second partial thickness of the total printed circuit board thickness, the second partial thickness being separate from the first partial thickness; and
determining the total thickness of the printed circuit board based upon the thicknesses of the core portion and the plating portion.

13. The method according to claim 12 further comprising:
directing the laser beam at a selected surface for supporting the printed circuit board prior to the step of moving the printed circuit board to the core thickness measuring station, the laser beam at least partially reflecting from the selected surface;
monitoring the laser beam reflected from the selected surface; and
initializing a reference value based upon the monitoring of the laser beam reflected from the selected surface, the reference value being used to derive the thickness of the core portion.

14. The method according to claim 12 wherein the step of monitoring the thermal characteristics of the plating portion comprises measuring a surface temperature of the plating portion over a selected distance of the plating portion.

15. The method according to claim 12 wherein the step of monitoring the thermal characteristics of the plating portion comprises measuring infrared radiation emanating from the plating portion.

16. The method according to claim 12 wherein the step of heating the plating portion comprises directing a plurality of intermittent laser beam pulses to the plating portion.

17. The method according to claim 12 wherein the step of heating the plating portion comprises directing a plurality of intermittent laser beam pulses to the plating portion; and
wherein the step of monitoring the thermal characteristics of the plating portion comprises measuring radiant thermal energy radiating from the plating portion.

18. The method according to claim 12 wherein the step of determining a total thickness comprises adding the thickness of the core portion to the thickness of the plating portion to compute the total thickness of the printed circuit board, the method further comprising:
comparing the total thickness of the printed circuit board to a selected thickness; and
determining acceptance and rejection of the printed circuit board based upon results from comparing the total thickness to the selected thickness.

19. The method according to claim 12 further comprising:
comparing the thickness of the core portion to a selected core thickness;
comparing the thickness of the plating portion to a selected plating portion thickness; and
determining acceptance and rejection of the printed circuit board based upon results of either comparison.

20. A method for measuring a thickness of a printed circuit board having a plating portion of a first material provided on two sides of a core portion of a second material, the printed circuit board having a total thickness, the method comprising the steps of:
directing a laser beam to the core portion of the printed circuit board, the laser beam at least partially reflecting from the core portion;
monitoring the laser beam reflected from the core portion;
deriving a thickness of the core portion based upon the monitoring of the laser beam reflected from the core portion to measure a first partial thickness of the total printed circuit board thickness;
heating a first plating portion on a first side of the printed circuit board by transferring a first selected amount of energy to the first plating portion;
monitoring thermal characteristics of the first plating portion on the first side of the printed circuit board upon transfer of the first selected amount of energy to the first plating portion;
heating a second plating portion on a second side of the printed circuit board by transferring a second selected amount of energy to the second plating portion;
monitoring thermal characteristics of the second plating portion on the second side of the printed circuit board upon transfer of the second selected amount of energy to the second plating portion; and deriving a combined thickness of the first and second plating portions independent of the core portion based upon the thermal characteristics of the plating portions on the first and second sides of the printed circuit board to measure a second partial thickness of the total printed circuit board thickness, the second partial thickness being separate from the first partial thickness.

21. The method according to claim 20 further comprising determining the total thickness of the printed circuit board based upon the thickness of the core portion and the combined thickness of the first and second plating portions.

22. The method according to claim 20 wherein each of the steps of monitoring the thermal characteristics of the first and second plating portions comprises measuring a surface temperature of the plating portion over a selected distance of a plating portion.

23. The method according to claim 20 wherein each of the steps of monitoring the thermal characteristics of the first and second plating portions comprises measuring infrared radiations emanating from a plating portion.

24. The method according to claim 20 wherein each of the steps of heating the first and second plating portions comprises directing a plurality of intermittent laser beam pulses to a plating portion.

25. The method according to claim 20 wherein the step of heating the plating portion comprises directing a plurality of intermittent laser beam pulses to a location on the plating portion; and wherein the step of monitoring the thermal characteristics of the plating portion comprises measuring a surface temperature of the plating portion a selected distance from the location to which the laser beam is directed, the surface temperature being dependent upon the thickness of the plating portion.

26. The method according to claim 20 wherein each of the steps of heating the first and second plating portions comprises directing a plurality of intermittent laser beam pulses to the plating portion; and wherein each of the steps of monitoring the thermal characteristics of the first and second plating portions comprises measuring radiant thermal energy radiating from a plating portion.

27. The method according to claim 20 further comprising:
adding the thickness of the core portion to the combined thickness of the first and second plating portions to compute the total thickness of the printed circuit board;
comparing the total thickness of the printed circuit board to a selected thickness; and
determining acceptance and rejection of the printed circuit board based upon results from comparing the total thickness to the selected thickness.

* * * * *